US012732024B2

(12) United States Patent
Wu et al.

(10) Patent No.: US 12,732,024 B2
(45) Date of Patent: Sep. 8, 2026

(54) WIRELESS CHARGING CIRCUIT AND DEVICE

(71) Applicant: HONOR DEVICE CO., LTD., Shenzhen (CN)

(72) Inventors: Yuan Wu, Shenzhen (CN); Wei Zhang, Shenzhen (CN); Feng Wang, Shenzhen (CN); Chao Wang, Shenzhen (CN); Lilie Zhao, Shenzhen (CN); Youjun Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 179 days.

(21) Appl. No.: 18/248,201

(22) PCT Filed: Aug. 26, 2022

(86) PCT No.: PCT/CN2022/114977
§ 371 (c)(1),
(2) Date: Apr. 6, 2023

(87) PCT Pub. No.: WO2023/098173
PCT Pub. Date: Jun. 8, 2023

(65) Prior Publication Data
US 2024/0372404 A1 Nov. 7, 2024

(30) Foreign Application Priority Data
Dec. 1, 2021 (CN) ........................ 202111449590.2

(51) Int. Cl.
*H02J 50/12* (2016.01)
*G06F 3/0354* (2013.01)
(Continued)

(52) U.S. Cl.
CPC .......... *H02J 50/12* (2016.02); *G06F 3/03545* (2013.01); *G06F 3/038* (2013.01);
(Continued)

(58) Field of Classification Search
CPC ...................................................... H02J 50/12
(Continued)

(56) References Cited

U.S. PATENT DOCUMENTS 10,651,685 B1 * 5/2020 Herbst .................. H02J 50/402
2011/0266880 A1 * 11/2011 Kim ........................ H02J 50/50 307/104
(Continued)

FOREIGN PATENT DOCUMENTS

CN 102170177 A 8/2011
CN 102662494 A 9/2012
(Continued)

*Primary Examiner* — Jerry D Robbins
(74) *Attorney, Agent, or Firm* — Fish & Richardson P.C.

(57) ABSTRACT

This application provides a wireless charging circuit and a device. The wireless charging circuit includes a power supply module, an inverter module, and a first coil component; the first coil component includes at least one coil; the power supply module is connected to the inverter module, and the inverter module is connected to the first coil component; the power supply module is configured to: output a direct current signal to the inverter module; and the inverter module is configured to: convert the direct current signal into an alternating current signal at a target resonant frequency, and output the alternating current signal to the first coil component, where the target resonant frequency is at an MHz level. In this application, a stylus can obtain electric energy from a power supply device without being clung to the power supply device.

12 Claims, 7 Drawing Sheets

(51) Int. Cl.
*G06F 3/038* (2013.01)
*H02J 7/40* (2026.01)
*H02J 7/90* (2026.01)
*H02J 50/40* (2016.01)
*H02J 50/80* (2016.01)

(52) U.S. Cl.
CPC ................ *H02J 7/40* (2026.01); *H02J 7/933* (2026.01); *H02J 50/402* (2020.01); *H02J 50/80* (2016.02)

(58) Field of Classification Search
USPC .......................................................... 320/114
See application file for complete search history.

(56) References Cited

U.S. PATENT DOCUMENTS

2014/0084858 A1* 3/2014 Kim .......................... H02J 7/90 320/108
2014/0265615 A1* 9/2014 Kim ........................ B60L 58/12 307/104
2018/0329527 A1* 11/2018 Park .................... G06F 3/03545
2019/0068002 A1* 2/2019 Liang ...................... H02J 50/60
2020/0099245 A1* 3/2020 Ruscher .................. H02J 50/90
2021/0194268 A1 6/2021 Jia
2021/0305848 A1 9/2021 Song et al.
2022/0155878 A1* 5/2022 Park ........................ G06F 3/038

FOREIGN PATENT DOCUMENTS

CN 103941890 A 7/2014
CN 104377841 A 2/2015
CN 208923853 U 5/2019
CN 109148990 B 12/2020
CN 113629894 A 11/2021
CN 113852172 A 12/2021
EP 3136613 A1 3/2017

* cited by examiner

WIRELESS CHARGING CIRCUIT AND DEVICE

CROSS-REFERENCE TO RELATED APPLICATIONS

This application is a national stage of International Application No. PCT/CN2022/114977, filed on Aug. 26, 2022, which claims priority to Chinese Patent Application No. 202111449590.2, filed on Dec. 1, 2021. The disclosures of both of the aforementioned applications are hereby incorporated by reference in their entireties.

TECHNICAL FIELD

This application relates to the field of wireless charging technologies, and in particular, to a wireless charging circuit and a device.

BACKGROUND

To ensure the integrity and ID aesthetics of a stylus, a stylus with a wireless charging function has emerged. When a stylus is wirelessly charged, the stylus needs to be clung to a charging side of a power supply device (for example, a PAD), and the stylus cannot be charged by the power supply device when the stylus is removed.

SUMMARY

This application provides a wireless charging circuit and a device, so that a stylus can obtain electric energy from a power supply device without being clung to the power supply device.

According to a first aspect, an embodiment of this application provides a wireless charging circuit, applied to a power supply device and including: an inverter module and a first coil component, where the first coil component includes at least one coil;

the inverter module is connected to the first coil component;

the inverter module is configured to: obtain a direct current signal, convert the direct current signal into a first alternating current signal at a target resonant frequency, and output the first alternating current signal to the first coil component, where the target resonant frequency is at an MHz level; and the first coil component is configured to emit a wireless charging signal based on the first alternating current signal.

The first alternating current signal output by the inverter module in the wireless charging circuit has a resonant frequency at an MHz level, so that the power supply device can charge the stylus without clinging the stylus to the power supply device.

In a possible implementation, the first coil component includes at least two coils, and the coils are distributed at different positions of the power supply device; and that the inverter module is connected to the first coil component includes: the inverter module is connected to each coil.

In the implementation, the first coil component includes at least two coils, and the coils are distributed at different positions of the power supply device, so that the stylus can be charged with a closer coil when the stylus is at different positions, thereby improving the efficiency of charging the stylus.

In a possible implementation, that the coils are distributed at different positions of the power supply device includes: the coils are evenly distributed at different positions of the power supply device based on a screen of the power supply device.

In a possible implementation, the circuit further includes a first processing module, and the first coil component further includes a coil gating submodule and a switching submodule; and the switching submodule is connected to the first processing module and the coil gating submodule respectively;

that the inverter module is connected to each coil includes: the inverter module is connected to each coil by using the coil gating submodule;

the first processing module is configured to: detect a writing position of a stylus on the screen, select a target coil from the coils in the first coil component based on the writing position, and send information of the selected target coil to the switching submodule; and the switching submodule is configured to: control the coil gating submodule to gate a path between the target coil and the inverter module based on the information of the target coil.

In the implementation, the stylus can be charged with a plurality of coils closest to the writing position, that is, a plurality of coils closest to the stylus, based on the writing position of the stylus, thereby reducing electric energy loss of the coils, and improving the efficiency of charging the stylus by the power supply device.

In a possible implementation, the coil gating submodule includes a plurality of switches;

and each coil in the first coil component corresponds to one switch;

that the inverter module is connected to each coil by using the coil gating submodule includes: the inverter module is connected to each coil by using a switch corresponding to the coil; and that the switching submodule is configured to control the coil gating submodule to gate a path between the target coil and the inverter module includes: the switching submodule is configured to control a switch corresponding to the target coil to turn on, and control a switch corresponding to a coil other than the target coil to turn off.

In a possible implementation, the circuit further includes:

a first communication module, configured to receive a charging request from the stylus, and send the charging request to the first processing module; and further configured to receive a charging stop request from the stylus, and send the charging stop request to the first processing module; and the first processing module is further configured to: control the inverter module to start operating when it is determined, based on the charging request, to charge the stylus; and control the inverter module to stop operating when it is determined, based on the charging stop request, to stop charging the stylus.

In a possible implementation, the first processing module is further configured to: receive a required charging power from the stylus, calculate a first target power based on the required charging power, and send the first target power to the inverter module; and the inverter module is further configured to: adjust the output first alternating current signal based on the first target power, so that output power of the inverter module reaches the first target power.

In a possible implementation, the coils are planar coils.

According to a second aspect, an embodiment of this application provides a wireless charging circuit, applied to a stylus and including: a second coil component and a rectifier module, where the second coil component is connected to the rectifier module;

the second coil component is configured to: receive a wireless charging signal, at a target resonant frequency, emitted by a power supply device, convert the wireless charging signal into a second alternating current signal, and transmit the second alternating current signal to the rectifier module, where the target resonant frequency is at an MHz level; and the rectifier module is configured to: rectify the second alternating current signal into a direct current signal, where the direct current signal is used to charge a battery pack of the stylus and/or supply power to a power circuit of the stylus.

In the wireless charging circuit, the wireless charging signal received by the second coil component has a resonant frequency at an MHz level, so that the stylus can obtain electric energy from the power supply device without being clung to the power supply device, so as to charge the battery pack of the stylus and/or supply power to the power circuit of the stylus by using the obtained electric energy.

In a possible implementation, the circuit further includes a second processing module and a second communication module, where the second processing module is configured to send a charging request to the power supply device by using the second communication module, where the charging request is used to request the power supply device to send a wireless charging signal; and is further configured to send a charging stop request to the power supply device by using the second communication module, where the charging stop request is used to request the power supply device to stop sending the wireless charging signal.

In a possible implementation, the circuit further includes:

an electric quantity detection module, configured to: detect electric quantity information of the battery pack in the stylus, and send a detection result to the second processing module; where that the second processing module is configured to send a charging request to the power supply device by using the second communication module includes: the second processing module is configured to send a charging request to the power supply device by using the second communication module when it is determined, based on the detection result, to perform wireless charging; and that the second processing module is configured to send a charging stop request to the power supply device by using the second communication module includes: the second processing module is configured to send a charging stop request to the power supply device by using the second communication module when it is determined, based on the detection result, to stop wireless charging.

In a possible implementation, the second processing module is further configured to: control the rectifier module to start rectifying the second alternating current signal output by the second coil component when it is determined, based on the detection result, to perform wireless charging; and control the rectifier module to stop the rectifying when it is determined, based on the detection result, to stop wireless charging.

In a possible implementation, the circuit further includes: the second processing module is further configured to calculate a required charging power based on the detection result, and send the required charging power to the power supply device by using the second communication module.

According to a third aspect, an embodiment of this application provides a power supply device, including the wireless charging circuit according to any one of the implementations of the first aspect.

According to a fourth aspect, an embodiment of this application provides a stylus including the wireless charging circuit according to any one of the second aspect or the implementations of the second aspect.

BRIEF DESCRIPTION OF DRAWINGS

To describe technical solutions in embodiments of the present invention more clearly, the following briefly describes accompanying drawings required for describing the embodiments. Apparently, the accompanying drawings in the following description show only some embodiments of the present invention, and a person of ordinary skill in the art may still derive other drawings from these accompanying drawings without creative efforts.

DESCRIPTION OF EMBODIMENTS

Terms used in implementations of this application are only used to explain specific embodiments of this application, and are not intended to limit this application.

Rechargeable styluses may be charged in two modes.

One is wired charging. In this charging mode, a stylus is equipped with a wired charging interface, such as a Type-C interface or a USB interface; and the wired charging interface is connected to a power supply device (such as an adapter) by using a cable for charging.

Figure 1A:
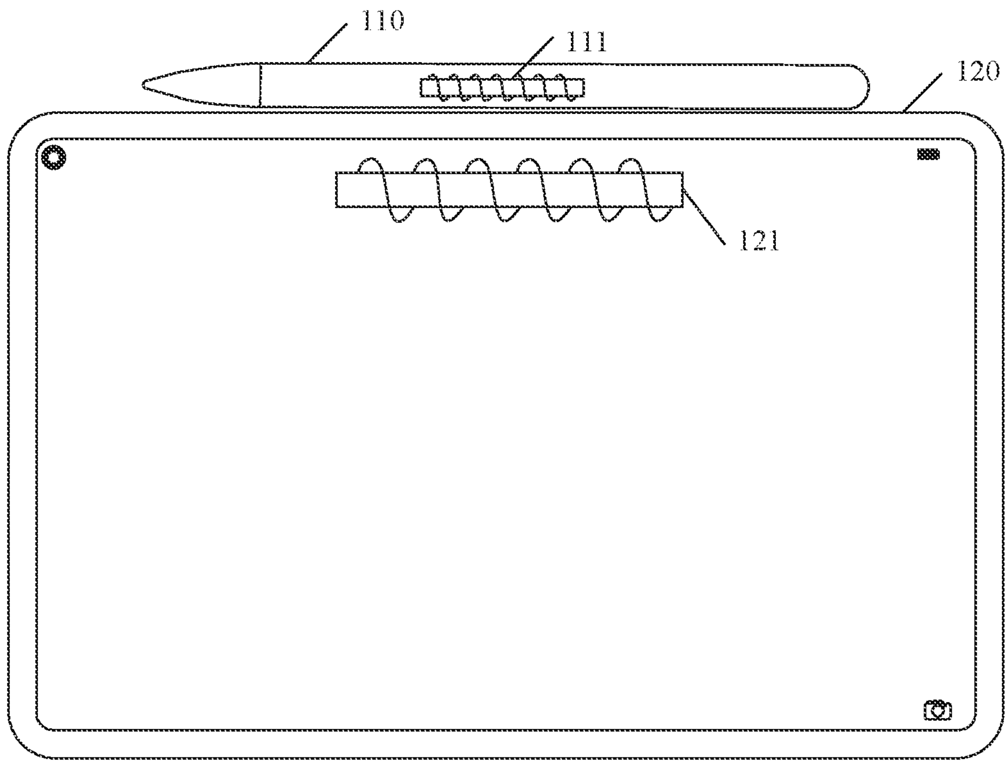
FIG. 1A is a schematic diagram of a charging mode in which a stylus is clung to a power supply device according to this application.

The other is wireless charging. A stylus with a wireless charging function may ensure integrity and ID aesthetics of the stylus, and therefore, such a stylus has become the mainstream of technology development in the industry. In one example, a stylus is attached to a power supply device (for example, a PAD, a universal wireless TX base, a mobile phone with a wireless reverse charging function, or a TX apparatus customized for a stylus) for wireless charging; and there is an interface between the stylus and the power supply device, the power supply device is located on one side of the interface, and the stylus is located on the other side of the interface. For example, FIG. 1A is a schematic diagram of a stylus 110 attached to a PAD 120 for wireless charging. The stylus 110 and the PAD 120 are provided with a coil 111 and a coil 121 respectively. The coil 111 and the coil 121 are in the form of solenoids. The stylus 110 is wirelessly charged by the PAD 120 by using the coil 111 and the coil 121 in the form of magnetic coupling. Signal resonant frequency is generally between 110 kHz and 200 kHz. In this charging mode, the stylus needs to be clung to the power supply device. Once the stylus is removed, the coupling drops sharply due to the increase in distance, and consequently, the stylus cannot be charged.

Therefore, this application provides a wireless charging circuit and a device, so that a stylus can obtain electric energy from a power supply device without being clung to the power supply device.

The power supply device in this application may be an electronic device such as a mobile phone, a portable android device (PAD), a personal computer (personal computer, PC) or a wearable device.

The stylus in this application may be provided with a battery pack, or may not be provided with a battery pack. If a battery pack is provided, a power circuit is usually powered by the battery pack; or if a battery pack is not provided, electric energy may be obtained directly from the power supply device to supply power to the power circuit in the stylus.

Figure 1B:
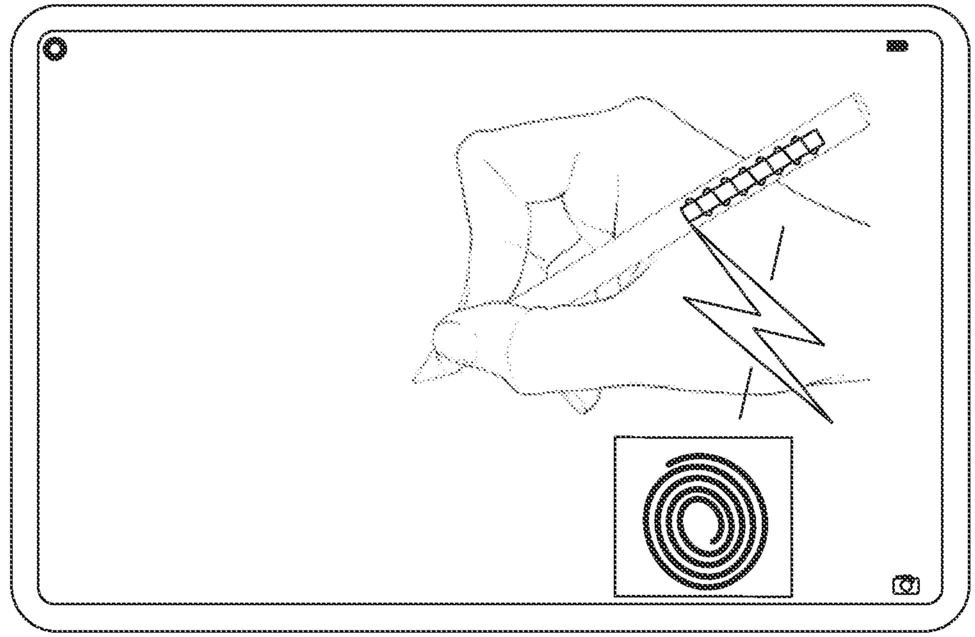
FIG. 1B is a schematic diagram of a charging mode between a stylus and a power supply device according to this application.

When the stylus in this application obtains electric energy from a power supply device (for example, a PAD), a positional relationship is not limited to clinging the stylus to the power supply device. For example, as shown in FIG. 1B, the stylus may obtain electric energy from the power supply device when a user is using the stylus. Specifically, if the stylus is provided with a battery pack, the stylus may be attached to the PAD for wireless charging, or may be wirelessly charged at a distance from the PAD; or if the stylus is not provided with a battery, the PAD may supply power to a power circuit in the stylus when the user uses the stylus to write on the PAD.

Figure 1C:
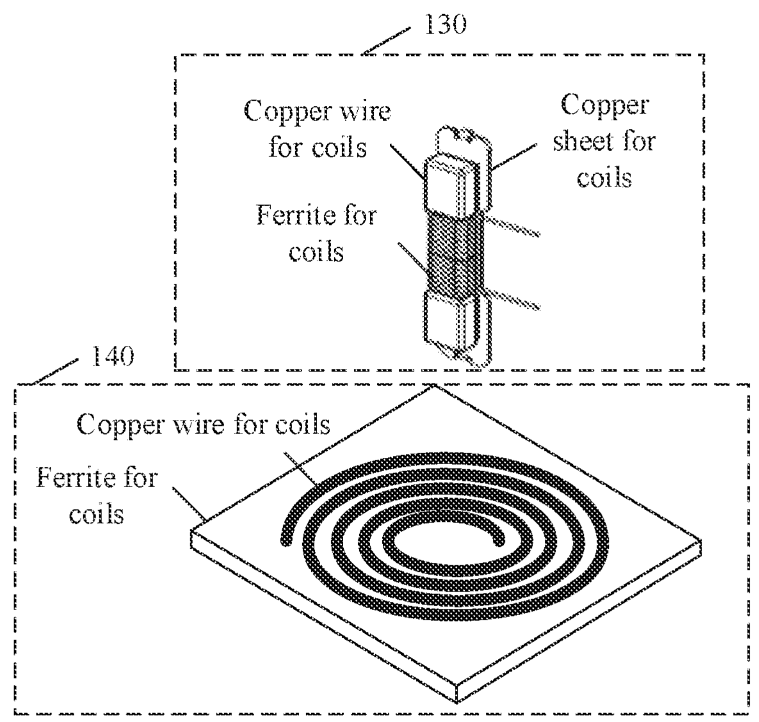
FIG. 1C is a schematic diagram of structures of a magnetic rod coil and a planar coil according to an embodiment of this application.

It should be noted that coils in the stylus and the power supply device in FIG. 1B are provided for illustration purposes only, and are not intended to limit implementations of the coils in the stylus and the power supply device. For example, in a possible implementation, the stylus may be provided with a magnetic rod coil 130 as shown in FIG. 1C, and the power supply device may be provided with a planar coil 140 as shown in FIG. 1C. When the user uses the stylus to write on a screen, a magnetic rod coil 130 in the stylus is approximately perpendicular to a planar coil 140 in the power supply device, so that the planar coil 140 may interact well with the magnetic rod coil 130 in terms of a wireless charging signal.

The power supply device may be provided with one or more coils, which is not limited in this embodiment of this application. For example, the power supply device is provided with a planar coil as shown in FIG. 1C. To improve the efficiency of charging the stylus by the power supply device, the power supply device may be provided with a plurality of planar coils, and the plurality of planar coils may be evenly arranged in the power supply device based on a plane where the screen is located, so that when the user uses the stylus to write at any position on the screen, there is a coil unit closer to the user, thereby improving the charging efficiency of the stylus. For example, in FIG. 1D, the plane where the screen of the power supply device is located is equally divided into four areas, and each area is provided with one planar coil. Correspondingly, the power supply device may determine, based on an area where the writing position of the stylus is located, a coil for charging the stylus.

Figure 2:
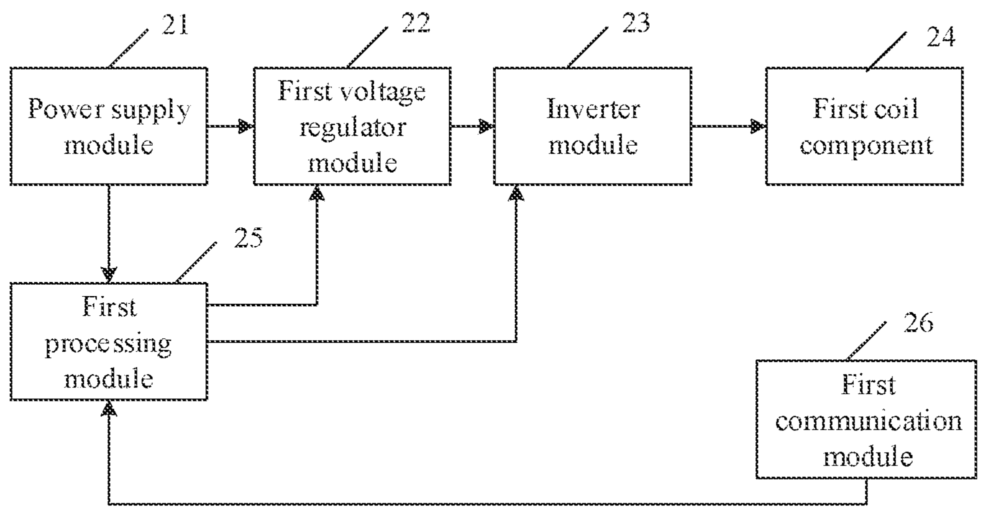
FIG. 2 is a schematic diagram of a structure of a power supply device according to an embodiment of this application.

FIG. 2 is a schematic diagram of a structure of a wireless charging circuit according to an embodiment of this application. The wireless charging circuit may be specifically applied to a power supply device. As shown in FIG. 2, a power supply device 20 includes a power supply module 21, a first voltage regulator module 22, an inverter module 23, and a first coil component 24.

A voltage output terminal of the power supply module 21 is connected to an input terminal of the first voltage regulator module 22. The power supply module 21 is configured to: output a first direct current signal to the first voltage regulator module 22; and optionally, the first direct current signal may be a direct current voltage signal.

An output terminal of the first voltage regulator module 22 is connected to a first input terminal of the inverter module 23. The first voltage regulator module 22 is configured to: perform voltage regulation on the first direct current signal to obtain a second direct current signal, and output the second direct current signal to the inverter module 23. The first voltage regulator module 22 according to this embodiment of this application is mainly used for voltage regulation. Therefore, the first voltage regulator module is an optional module. Optionally, the second direct current signal may be a direct current voltage signal.

An output terminal of the inverter module 23 is connected to an input terminal of the first coil component 24. The inverter module 23 is configured to: convert the second direct current signal into a first alternating current signal at a target resonant frequency, and output the first alternating current signal to the first coil component 24. Optionally, the target resonant frequency may be at a megahertz (MHz) level, and a specific value is not limited in this embodiment of this application. For example, in a possible implementation, the target resonant frequency may be 6.78 MHz specified in an existing long-range wireless charging protocol.

The first coil component 24 is configured to: output a wireless charging signal based on the received first alternating current signal.

The first coil component 24 includes a coil, and the coil generates an electromagnetic field after receiving an alternating current signal. When the stylus is located in the electromagnetic field, the coil in the stylus will generate current correspondingly, so that electric energy is obtained by the magnetic resonance technology to charge the battery in the stylus or supply power to the power circuit.

Figure 3:
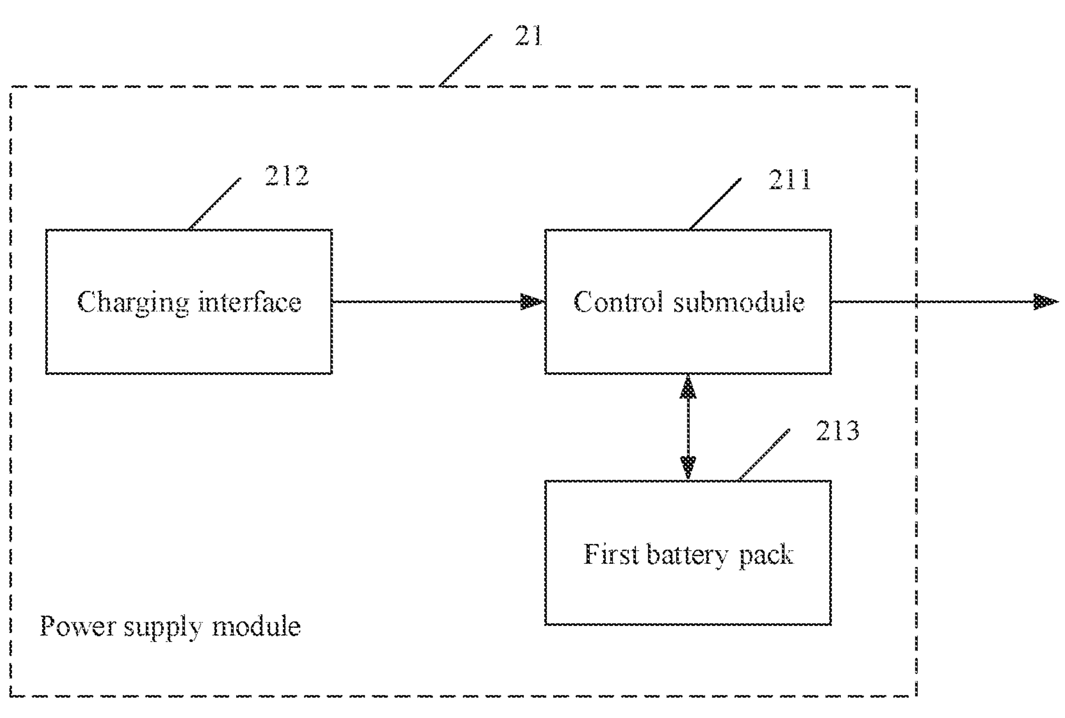
FIG. 3 is a schematic diagram of a structure of a power supply module according to this application.

Electric energy of the power supply module 21 may be supplied from the battery pack of the power supply device and/or a charging interface of the power supply device. For example, as shown in FIG. 3, the power supply module 21 may be implemented by using the following structure:

A first input terminal of a control submodule 211 is connected to a charging voltage transmission pin of a charging interface 212. For example, the charging interface 212 is a Type-C interface, and the charging voltage transmission pin may be a VBUS pin; a second input terminal of the control submodule 211 is connected to a first battery pack 213; and an output terminal of the control submodule 211 serves as an output terminal of the power supply module 21;

the control submodule 211 may be configured to: generate a first direct current signal based on a charging signal when the charging voltage transmission pin of the charging interface 212 transmits the charging signal, so as to supply electric energy to the first voltage regulator module 22; and generate the first direct current signal based on a voltage signal provided by the first battery pack 213 when the charging voltage transmission pin of the charging interface 212 does not transmit the charging signal.

Optionally, the control submodule 211 may be further configured to: charge the first battery pack 213 when the charging voltage transmission pin of the charging interface 212 transmits a charging signal.

Optionally, as shown in FIG. 2, the power supply device may further include a first processing module 25 and a first communication module 26.

An information output terminal of the power supply module 21 is connected to a first input terminal of the first processing module 25, and the power supply module 21 outputs power supply information to the first processing module 25. For example, if power is supplied from a battery pack, the power supply information may include a voltage value of the first direct current signal output by the power supply module 21, current electric quantity and a voltage value of the battery pack, and the like; or if power is supplied directly from a charging interface, the power supply information may include a voltage value of the first direct current signal output by the power supply module 21, and the like.

The first communication module 26 is configured to communicate with the stylus, and send information received from the stylus to the first processing module 25.

The first processing module 25 is configured to: control the first voltage regulator module 22, for example, control whether the first voltage regulator module 22 operates, control a voltage value of the first direct current signal output by the first voltage regulator module 22, or the like, and control the inverter module 23, for example, adjust output power of the inverter module 23, control whether the inverter module 23 operates, or the like.

Optionally, the first communication module 26 may be configured to: interact with the stylus in terms of a charging protocol, and send information in the charging protocol interaction to the first processing module 25. For example:

When the power supply device starts charging the stylus:

the first communication module 26 may be configured to: receive a charging request from the stylus, and send the charging request to the first processing module 25;

the first processing module 25 may be configured to: send a first enabling signal to the first voltage regulator module 22 when it is determined, based on the charging request, to charge the stylus, where the first enabling signal is used to control the first voltage regulator module 22 to start outputting a second direct current signal; and send a second enabling signal to the inverter module 23, where the second enabling signal is used to control the inverter module 23 to start outputting a first alternating current signal;

the first voltage regulator module 22 may be configured to: output a second direct current signal when receiving the first enabling signal; and the inverter module 23 may be configured to: output the first alternating current signal when receiving the first enabling signal.

When charging for the stylus is completed:

the first communication module 26 may be configured to: receive a charging stop request from the stylus, and send the charging stop request to the first processing module 25;

the first processing module 25 may be configured to: send a third enabling signal to the first voltage regulator module 22 when it is determined, based on the charging stop request, to stop charging the stylus, where the third enabling signal is used to control the first voltage regulator module 22 to stop outputting the second direct current signal; and send a fourth enabling signal to the inverter module 23, where the fourth enabling signal is used to control the inverter module 23 to stop outputting the first alternating current signal;

the first voltage regulator module 22 may be configured to: stop outputting the second direct current signal when receiving the third enabling signal; and the inverter module 23 may be configured to: stop outputting the first alternating current signal when receiving the fourth enabling signal.

When the power supply device is charging the stylus:

the first communication module 26 may be configured to: receive a required charging power from the stylus, and send the required charging power to the first processing module 25;

the first processing module 25 may be configured to: determine a first target power of the inverter module 23 based on the power supply information sent by the power supply module 21 and the required charging power sent by the first communication module 26, and send the first target power to the inverter module 23; and correspondingly, the inverter module 23 may be configured to: adjust operating parameters of the inverter module 23 based on the first target power, so that output power of the inverter module 23 reaches the first target power. Therefore, the inverter module 23 may output a corresponding first alternating current signal, so that the first coil component 24 can output a wireless charging signal with appropriate power, and therefore, the stylus can obtain electric energy with the required charging power.

Optionally, to ensure actual charging power of the power supply device better adapts to charging requirement of the stylus, the first processing module 25 may be specifically configured to: obtain a writing position of the stylus on the screen, and determine the first target power based on the power supply information, the writing position of the stylus, and the required charging power. Optionally, the distance between the stylus and the first coil component 24 is positively correlated with the first target power, that is, a larger distance indicates a higher first target power, and a smaller distance indicates a lower first target power.

Figure 1D:
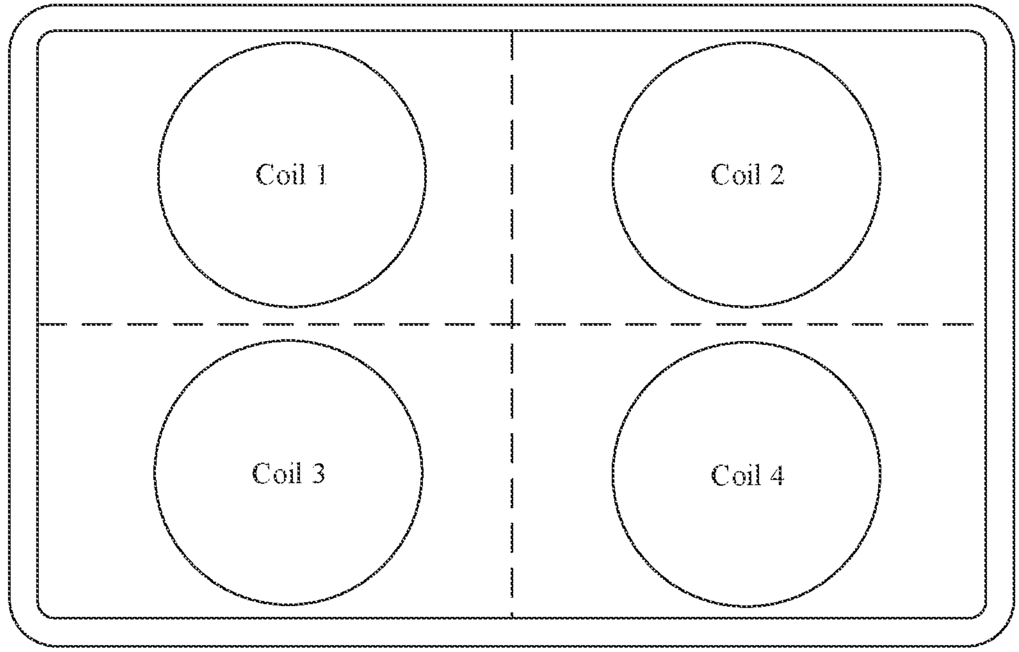
FIG. 1D is a schematic diagram of a coil distribution structure in a power supply device according to this application.
Figure 4:
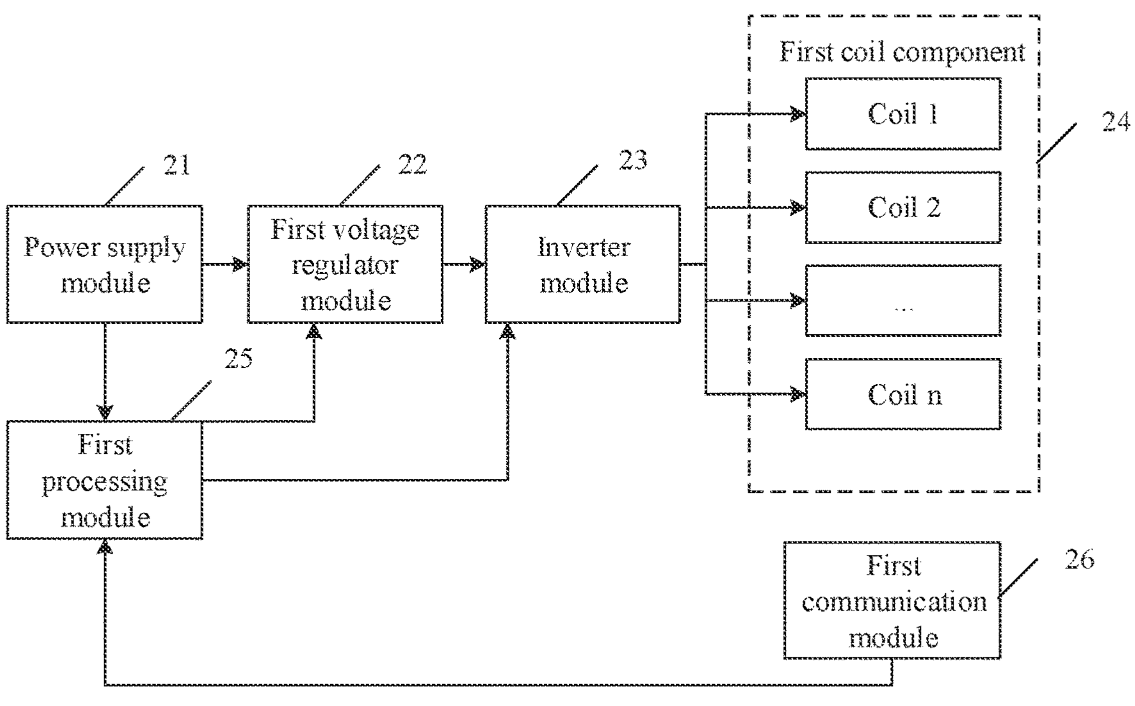
FIG. 4 is a schematic diagram of a structure of a power supply device according to another embodiment of this application.

FIG. 4 is a schematic diagram of a wireless charging circuit according to another embodiment of this application. On the basis of the wireless charging circuit shown in FIG. 2, a possible structure for implementing the first coil component 24 is further shown. Specifically, the first coil component 24 may include one or more coils. The coil included in the first coil component 24 may be a planar coil, as shown in FIG. 1C. If the first coil component 24 includes a plurality of coils, the plurality of coils may be evenly arranged in the power supply device based on a plane where the screen of the power supply device is located, as shown in FIG. 1D.

In this case, for the implementation of the power supply module 21, the first voltage regulator module 22, the inverter module 23, the first processing module 25, and the first communication module 26, refer to corresponding descriptions in FIG. 2. Details are not described herein again.

Figure 5A:
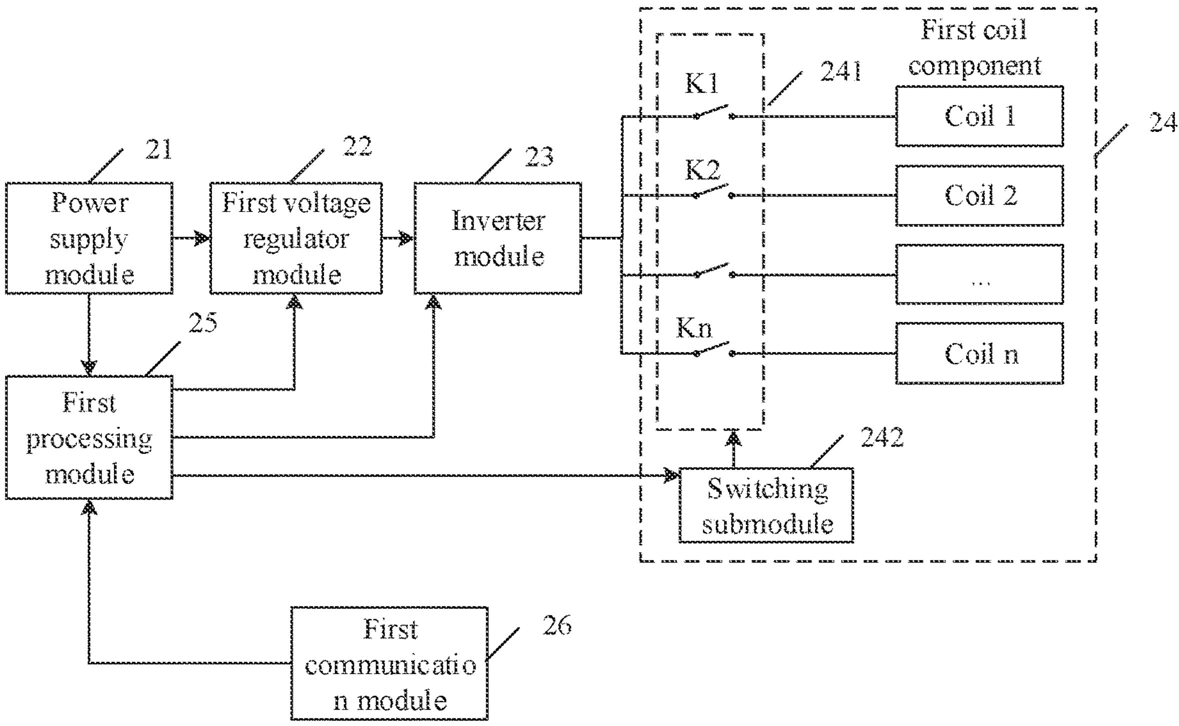
FIG. 5A is a schematic diagram of a structure of a power supply device according to another embodiment of this application.

FIG. 5A is a schematic diagram of a wireless charging circuit according to another embodiment of this application. Different from the embodiment shown in FIG. 4, when a quantity of coils in the first coil component 24 is greater than 1, the first coil component 24 further includes a coil gating submodule 241 and a switching submodule 242. An output terminal of the inverter module 23 may be connected to the first coil component 24 by using the coil gating submodule 241, and the first processing module 25 is connected to the switching submodule 242.

The first processing module 25 may be configured to: obtain a writing position of the stylus on the screen, select a coil to charge the stylus based on the writing position, and control a branch corresponding to the selected coil to turn on and branches corresponding to other coils to turn off.

For example, using the coil distribution structure shown in FIG. 1D as an example, the screen may be divided into four areas, an upper left area, a lower left area, an upper right area, and a lower right area; and each area is provided with a coil correspondingly. When the stylus is used to write on the screen of the power supply device, the power supply device may determine a writing position of the stylus on the screen based on coding information received on the screen from the stylus, and determine an area where the writing position is located. For example, if the area is the upper left area, the first processing module 25 may control a branch corresponding to a coil 1 in the upper left area to turn on and branches corresponding to other coils to turn off, so that the coil closest to the stylus supplies power to the stylus, thereby ensuring that the distance between the coil of the power supply device and the coil of the stylus is the shortest. In this way, wireless charging can be performed stably, and the charging efficiency of the stylus can be improved. When the writing position of the stylus on the screen gets into another area, such as the lower left area, the first processing module 25 may control a branch corresponding to a coil 3 in the lower left area to turn on and branches corresponding to other coils to turn off. Based on the foregoing processing, it may be ensured that the stylus is always charged wirelessly by the coil, in the power supply device, closest to the stylus during writing, thereby improving the charging efficiency of the stylus.

Optionally, as shown in FIG. 5A, the coil gating submodule 241 may be implemented by a plurality of switches, and a quantity of the switches may be the same as that of coils in the first coil component 24. Each coil corresponds to a switch, and an output terminal of the inverter module 23 may be connected to a corresponding coil in the first coil component 24 by using a switch. When a switch corresponding to a coil is turned on, the first alternating current signal output by the inverter module 23 may be output to the coil (for example, a coil 2) by using the switch (for example, a switch K2).

That the first processing module 25 controls a branch corresponding to the selected coil to turn on and branches corresponding to other coils turn off may specifically include: the first processing module 25 sends information of the selected coil to the switching submodule 242.

The switching submodule 242 may be configured to: control, based on information of a coil selected by the first processing module 25, a switch corresponding to the coil to turn on and other switches to turn off.

It should be noted that the first processing module 25 may select one or more coils close to the writing position from the coils, and determine the selected coils as coils for charging the stylus. Optionally, the first processing module 25 may sort the coils from the largest to the smallest based on the distance between the coils and the writing position, select a preset quantity of first few coils, and determine these coils as coils for charging the stylus. The preset quantity may be one or more, which is not limited in this embodiment of this application.

Optionally, the corresponding position of each coil on the screen may be recorded, and the distance between the coil and the writing position may be calculated based on this position; or the area where each coil is located may be recorded, and one or more coils closest to the writing position may be determined based on a positional relationship between the areas.

Figure 5B:
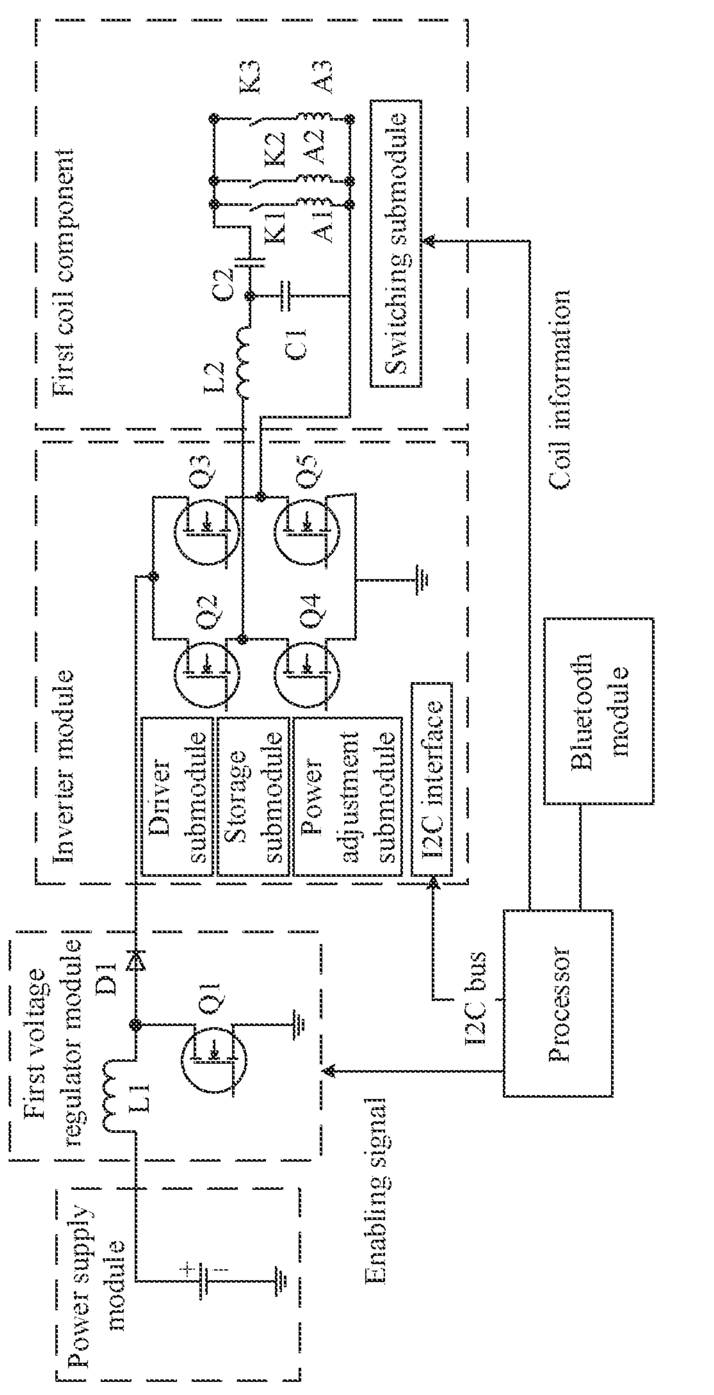
FIG. 5B is a schematic diagram of a structure of a power supply device according to yet another embodiment of this application.

FIG. 5B is a schematic diagram of an example of a wireless charging circuit in a power supply device, in which:

a power supply module includes batteries of the power supply device.

A first voltage regulator module is implemented by a Boost rectifier circuit including a first inductor L1, a first diode D1 and a first transistor Q1.

A first processing module may be implemented by a processor of the power supply device.

A first communication module may be implemented by a Bluetooth module.

An inverter module includes an inverter circuit including a second transistor Q2 to a fifth transistor Q5; a driver submodule; a storage submodule; a power adjustment submodule, and an I2C interface. The I2C interface is configured to communicate with the processor by using an I2C bus, for example, receive information of a first target power sent by the processor; the power adjustment submodule is configured to determine operating parameters of the inverter module based on the first target power, and write the determined operating parameters into the storage submodule; and the driver submodule is configured to control operation of the inverter module based on the operating parameters recorded by the storage submodule, for example, control transistors in the inverter circuit to turn on or turn off.

A first coil component may include a resonance circuit including a second inductor L2, a first capacitor CL, a second capacitor C2, switches K1-K3, and coils A1-A3; and a switching submodule. The switching submodule is connected to the processor, and receives information of a coil selected by the processor. The switching submodule controls a branch where the corresponding coil is located to turn on or turn off by controlling the turn-on or turn-off of switches K1-K3.

Figure 6:
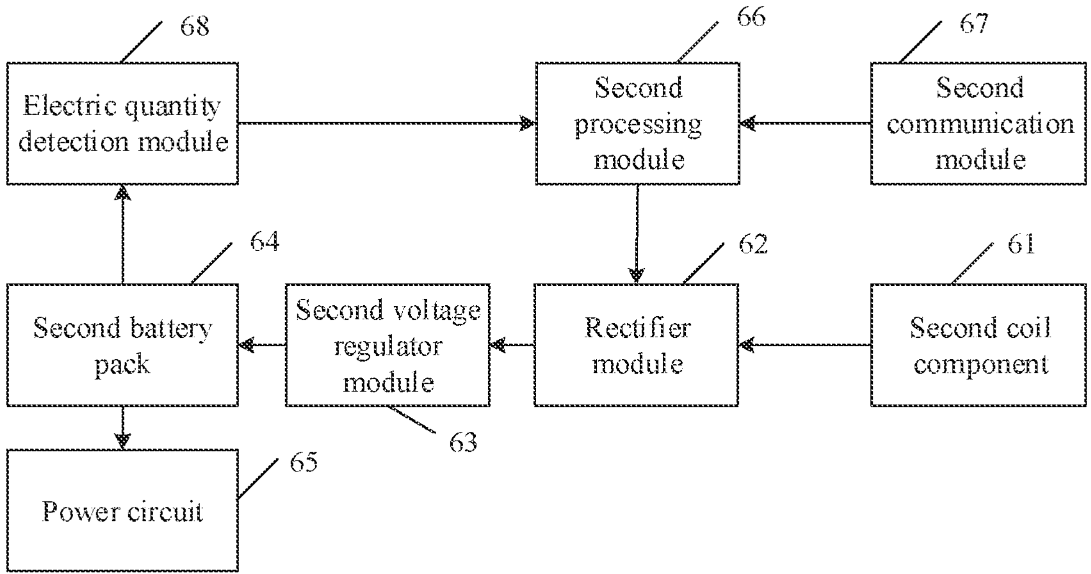
FIG. 6 is a schematic diagram of a structure of a stylus according to an embodiment of this application.

As shown in FIG. 6, a stylus 60 may include a second coil component 61, a rectifier module 62, a second voltage regulator module 63, and a second battery pack 64; where the second coil component 61 is connected to an input terminal of the rectifier module 62 to generate a second alternating current signal based on a wireless charging signal received, and send the second alternating current signal to the rectifier module 62;

an output terminal of the rectifier module 62 is connected to an input terminal of the second voltage regulator module 63 to rectify the received second alternating current signal to obtain a third direct current signal, and send the third direct current signal to the second voltage regulator module 63; and an output terminal of the second voltage regulator module 63 is connected to the second battery pack 64 to perform voltage regulation on the third direct current signal to obtain a fourth direct current signal, and output the fourth direct current signal to the second battery pack 64, so as to charge batteries in the second battery pack 64. The second voltage regulator module 63 according to this embodiment of this application is mainly used for voltage regulation. Therefore, the second voltage regulator module is an optional module.

Optionally, the third direct current signal and the fourth direct current signal may be direct current voltage signals.

Optionally, as shown in FIG. 6, the stylus 60 may further include a power circuit 65, and the second battery pack 64 may supply electric energy to the power circuit 65.

Optionally, as shown in FIG. 6, the stylus 60 may further include a second processing module 66, a second communication module 67, and an electric quantity detection module 68, where the electric quantity detection module 68 is connected to the second processing module 66 and the second battery pack 64 respectively, the second communication module 67 is connected to the second processing module 66, the second processing module 66 is connected to the second rectifier module 62, and the second processing module 66 is connected to the second voltage regulator module 63.

The electric quantity detection module 68 may be configured to: detect electric quantity of the batteries in the second battery pack 64, and send electric quantity information of the second battery pack 64 to the second processing module 66.

The second processing module 66 may be configured to: interact with the power supply device 20 in terms of a charging protocol by using the second communication module 67 to charge the second battery pack 64 in the stylus. For example:

The second processing module 66 may be configured to send a charging request to the power supply device 20 by using the second communication module 67 when it is determined, based on electric quantity information of the batteries, that the batteries need to be charged, where the charging request is used to request the power supply device to wirelessly charge the batteries of the stylus. Correspondingly, the second communication module 67 may be configured to: send the charging request to the power supply device.

The second processing module 66 may be further configured to send a charging stop request to the power supply device 20 by using the second communication module 67 when it is determined, based on electric quantity information of the batteries, that the batteries are fully charged, where the charging stop request is used to request the power supply device 20 to stop wirelessly charging the batteries of the stylus 60. Correspondingly, the second communication module 67 may be configured to: send the charging stop request to the power supply device.

The second processing module 66 may be further configured to: send an enabling signal to the rectifier module 62 and the second voltage regulator module 63 when it is determined, based on electric quantity information of the batteries, that the batteries need to be charged, so as to instruct the rectifier module 62 and the second voltage regulator module 63 to start operating; and send an enabling signal to the rectifier module 62 and the second voltage regulator module 63 when it is determined, based on electric quantity information of the batteries, that the batteries are fully charged, so as to instruct the rectifier module 62 and the second voltage regulator module 63 to stop operating.

Optionally, the second processing module 66 may be further configured to: send a required charging power to the power supply device by using the second communication module 67 when it is determined, based on electric quantity information of the batteries, to adjust charging power of the second battery pack 64.

Correspondingly, the second communication module 67 may be configured to: send the required charging power to the power supply device.

Optionally, the second processing module 66 may be further configured to: calculate a second target power when it is determined, based on electric quantity information of the batteries, to adjust charging power of the second battery pack 64, and send the second target power to the rectifier module 62.

The rectifier module 62 may be configured to: adjust operating parameters of the rectifier module 62 based on the second target power, so that output power of the rectifier module 62 reaches the second target power.

Through the foregoing implementation, charging power of the batteries in the stylus may be dynamically adjusted based on electric quantity information of the batteries, thereby improving the charging efficiency of the batteries.

Figure 7:
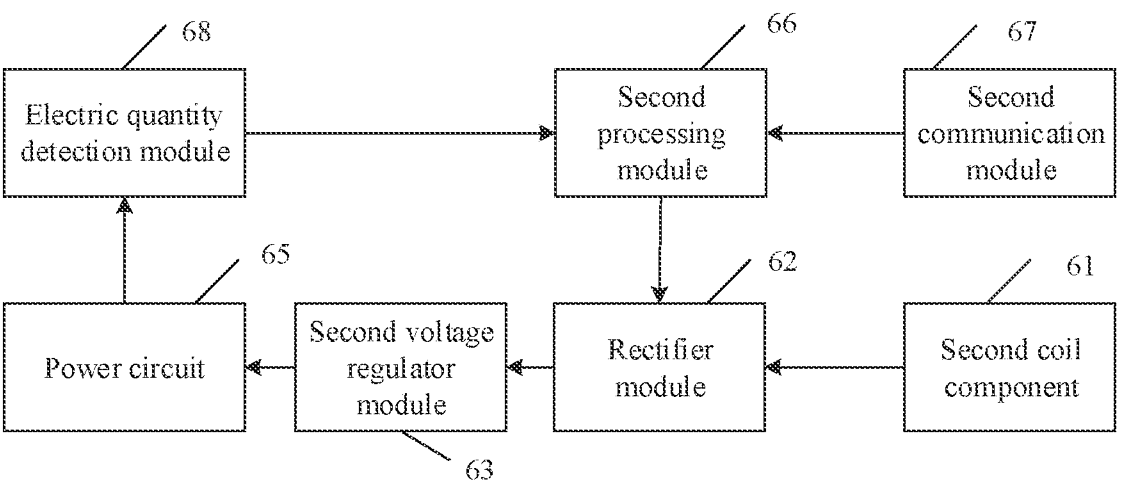
FIG. 7 is a schematic diagram of a structure of a stylus according to another embodiment of this application.

It should be noted that the second battery pack 64 in the stylus may be omitted. In this case, as shown in FIG. 7, the power circuit 65 may replace the second battery pack 64, and directly receive the fourth direct current signal output by the voltage regulator module 63. That is, the voltage regulator module 63 directly supplies power to the power circuit 65. In this case, the electric quantity detection module 69 may be configured to detect voltage and/or current information of the power circuit; and correspondingly, the second processing module 66 may be configured to determine whether to adjust the required charging power based on the voltage and/or current information of the power circuit.

The wireless charging circuit shown in FIG. 7 enables the stylus to operate without a battery pack.

Figure 8:
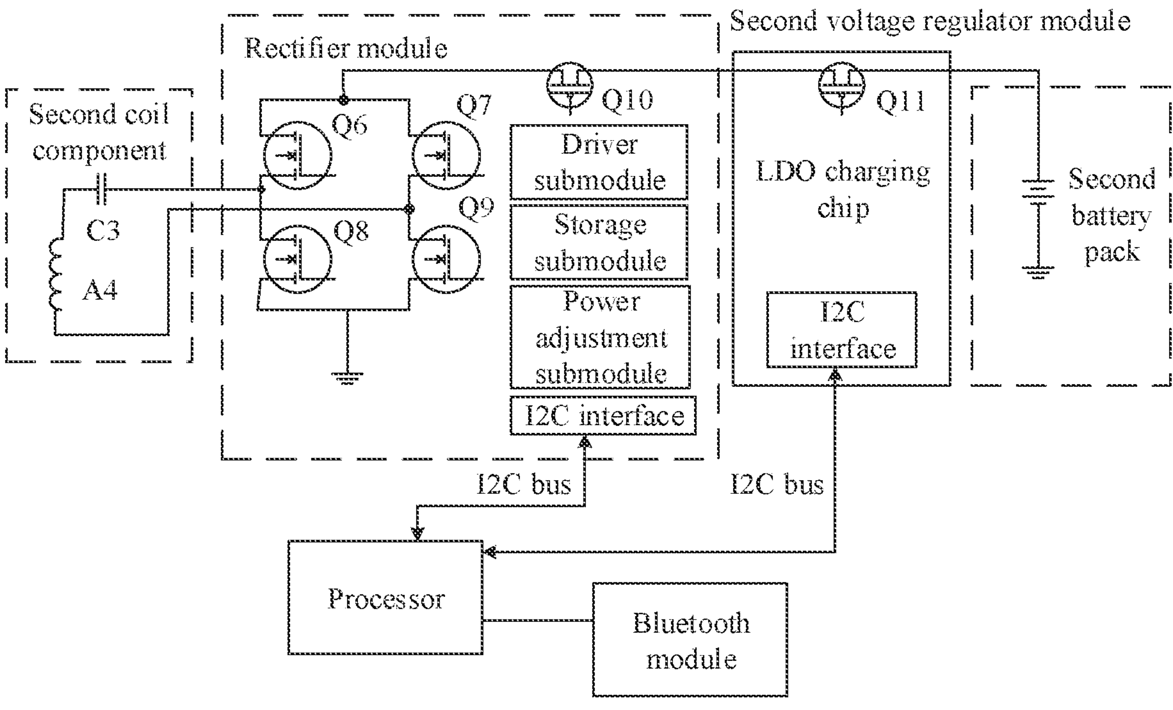
FIG. 8 is a schematic diagram of a structure of a stylus according to another embodiment of this application.

FIG. 8 is a schematic diagram of an example of a wireless charging circuit in a stylus, in which:

A second coil component includes: a resonance circuit including a capacitor C3 and a coil A4.

A first processing module may be implemented by a processor (for example, an MCU) of the stylus.

A first communication module may be implemented by a Bluetooth module.

A rectifier module includes: a rectifier circuit including transistors Q6-Q10; a driver submodule; a storage submodule; a power adjustment submodule, and an I2C interface. The I2C interface is configured to communicate with the processor by using an I2C bus, for example, receive information of a second target power sent by the processor; the power adjustment submodule is configured to determine operating parameters of the rectifier module based on the second target power, and write the determined operating parameters into the storage submodule; and the driver submodule is configured to control operation of the rectifier module based on the operating parameters recorded by the storage submodule, for example, control transistors in the rectifier circuit to turn on or turn off.

The second voltage regulator module may be implemented by using an LDO charging chip. The LDO charging chip may include an I2C interface and communicate with the processor through the I2C interface, for example, receive control information sent by the processor, so as to control operating parameters of the LDO charging chip.

An embodiment of this application provides a power supply device, including the wireless charging circuit according to any one of the embodiments of FIG. 2 to FIG. 5B.

An embodiment of this application provides a stylus, including the wireless charging circuit according to any one of the embodiments of FIG. 6 to FIG. 8.

The wireless charging circuit in the power supply device and the wireless charging circuit in the stylus according to the embodiments of this application cooperate with each other, so that mid-range wireless charging may be implemented, with a general distance range being writing distance of the stylus, for example, about 30 cm. The stylus according to this embodiment of this application may be wirelessly charged by the power supply device while being used by a user. Therefore, limitation of wireless charging on the stylus is reduced, and user experience is improved.

In embodiments of this application. "at least one" means one or more, and "a plurality of" means two or more. The term "and/or" describes an association relationship between associated objects, and indicates that three relationships may exist. For example, A and/or B may indicate the following: Only A exists, both A and B exist, and only B exists, where A and B each may indicate a singular or plural form. The symbol "/" generally represents an "or" relationship between associated objects. "At least one of the following" or a similar expression thereof indicates any combination of the following, and includes any combination of one or more of the following. For example, at least one of a, b, or c may indicate a, b, c, a and b, a and c, b and c, or a and c, where a, b, and c may indicate a singular or plural form.

A person of ordinary skill in the art may be aware that the units and algorithm steps described in the embodiments disclosed in this specification can be implemented by electronic hardware or a combination of computer software and electronic hardware. Whether these functions are implemented by using hardware or software depends on specific application of the technical solution and design constraints. A person skilled in the art may use different methods to implement the described functions for each particular application, but it should not be considered that the implementation goes beyond the scope of this application.

A person skilled in the art can clearly understand that, for convenience and brevity of description, reference may be made to corresponding processes in the method embodiments for specific operating processes of the foregoing system, apparatus, and unit. Details are not described herein again.

In embodiments provided in this application, if any function is implemented in the form of a software functional unit and sold or used as an independent product, the function may be stored in a computer readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (Read-Only Memory, hereinafter referred to as ROM), a random access memory (Random Access Memory, hereinafter referred to as RAM), a magnetic disk, or an optical disc.

The foregoing descriptions are merely specific implementations of this application. Any person skilled in the art can easily conceive modifications or replacements within the technical scope of this application, and these modifications or replacements shall fall within the protection scope of this application. The protection scope of this application shall be subject to the protection scope of the claims.

What is claimed is:

1. A wireless charging circuit, applied to a power supply device and comprising: an inverter module, a power supply module, a first processing module, a first communication module and a first coil component, wherein the first coil component comprises: a coil gating submodule, a switching submodule and at least two coils;

the inverter module is connected to the first coil component;

the inverter module is configured to: obtain a direct current signal, convert the direct current signal into a first alternating current signal at a target resonant frequency, and output the first alternating current signal to the first coil component, wherein the target resonant frequency is at an MHz level;

the first coil component is configured to emit a wireless charging signal based on the first alternating current signal;

the first communication module configured to receive a required charging power from a stylus, and send the required charging power to the first processing module;

the power supply module is further configured to send power supply information to the first processing module;

the first processing module configured to obtain a writing position of the stylus on a screen, and determine a first target power based on the power supply information, the writing position of the stylus, and the required charging power, wherein a distance between the stylus and the first coil component is determined based on the writing position, and the first target power is positively correlated with the distance such that a larger distance indicates a higher first target power, and sending the first target power to the inverter module;

the inverter module is also used for: adjusting an output power of the inverter module to the first target power;

the stylus include a second processing module, a second communication module, and an electric quantity detection module;

the electric quantity detection module configured to detect electric quantity of batteries in a battery pack and send electric quantity information of the battery pack to the second processing module; and the second processing module configured to interact with the power supply device in terms of a charging protocol by using the second communication module to charge a second battery pack in the stylus.

2. The circuit according to claim 1, wherein the coils are distributed at different positions of the power supply device; and that the inverter module is connected to the first coil component comprises:

the inverter module is connected to each coil.

3. The circuit according to claim 2, wherein that the coils are distributed at different positions of the power supply device comprises: the coils are evenly distributed at different positions of the power supply device based on a screen of the power supply device.

4. The circuit according to claim 2, wherein the circuit further comprises a first processing module; and the switching submodule is connected to the first processing module and the coil gating submodule respectively;

that the inverter module is connected to each coil comprises: the inverter module is connected to each coil by using the coil gating submodule;

the first processing module is configured to: detect a writing position of a stylus on the screen, select a target coil from the coils in the first coil component based on the writing position, and send information of the selected target coil to the switching submodule; and the switching submodule is configured to: control the coil gating submodule to gate a path between the target coil and the inverter module based on the information of the target coil.

5. The circuit according to claim 4, wherein the coil gating submodule comprises a plurality of switches; and each coil in the first coil component corresponds to one switch;

that the inverter module is connected to each coil by using the coil gating submodule comprises: the inverter module is connected to each coil by using a switch corresponding to the coil; and that the switching submodule is configured to control the coil gating submodule to gate a path between the target coil and the inverter module comprises: the switching submodule is configured to: control a switch corresponding to the target coil to turn on, and control a switch corresponding to a coil other than the target coil to turn off.

6. The circuit according to claim 4, wherein the circuit further comprises:

a first communication module, configured to receive a charging request from the stylus, and send the charging request to the first processing module; and further configured to receive a charging stop request from the stylus, and send the charging stop request to the first processing module; wherein the first processing module is further configured to: control the inverter module to start operating when it is determined, based on the charging request, to charge the stylus; and control the inverter module to stop operating when it is determined, based on the charging stop request, to stop charging the stylus.

7. The circuit according to claim 1, wherein the coils are planar coils.

8. A wireless charging circuit, applied to a stylus and comprising: a second coil component, a rectifier module, a second processing module, a second communication module, and an electric quantity detection module, wherein the second coil component is connected to the rectifier module;

the second coil component is configured to: receive a wireless charging signal, at a target resonant frequency, emitted by a power supply device, convert the wireless charging signal into a second alternating current signal, and transmit the second alternating current signal to the rectifier module; wherein the target resonant frequency is at an MHz level; and the rectifier module is configured to: rectify the second alternating current signal into a direct current signal, and the direct current signal is used to charge a battery pack of the stylus and/or supply power to a power circuit of the stylus;

the electric quantity detection module is configured to detect electric quantity information of the battery pack in the stylus, and send a detection result to the second processing module; and the second processing module is configured to calculate a required charging power based on the detection result, and send the required charging power to the power supply device by using the second communication module to cause the power supply device to adjust an output power of the wireless charging signal based on a writing position of the stylus.

9. The circuit according to claim 8, wherein the second processing module is configured to send a charging request to the power supply device by using the second communication module, wherein the charging request is used to request the power supply device to send a wireless charging signal; and is further configured to send a charging stop request to the power supply device by using the second communication module, wherein the charging stop request is used to request the power supply device to stop sending the wireless charging signal.

10. The circuit according to claim 9, further comprising:

wherein the electric quantity detection module is configured to: detect electric quantity information of the battery pack in the stylus, and send a detection result to the second processing module; wherein that the second processing module is configured to send a charging request to the power supply device by using the second communication module comprises: the second processing module is configured to send a charging request to the power supply device by using the second communication module when it is determined, based on the detection result, to perform wireless charging; and that the second processing module is configured to send a charging stop request to the power supply device by using the second communication module comprises: the second processing module is configured to send a charging stop request to the power supply device by using the second communication module when it is determined, based on the detection result, to stop wireless charging.

11. The circuit according to claim 10, wherein the second processing module is further configured to: control the rectifier module to start rectifying the second alternating current signal output by the second coil component when it is determined, based on the detection result, to perform wireless charging; and control the rectifier module to stop the rectifying when it is determined, based on the detection result, to stop wireless charging.

12. A stylus, comprising the wireless charging circuit according to claim 8.

* * * * *